US008751411B2

(12) United States Patent  
Nagarajan et al.

(10) Patent No.: US 8,751,411 B2  
(45) Date of Patent: Jun. 10, 2014

(54) SYSTEM AND METHOD FOR DETERMINING A BILLING STRUCTURE FOR DOCUMENTS BASED ON COLOR ESTIMATIONS IN AN IMAGE PATH

(75) Inventors: Ramesh Nagarajan, Pittsford, NY (US); Xing Lin, Webster, NY (US)

(73) Assignee: Xerox Corporation, Norwalk, CT (US)

(*) Notice: Subject to any disclaimer, the term of this patent is extended or adjusted under 35 U.S.C. 154(b) by 882 days.

(21) Appl. No.: 12/246,956

(22) Filed: Oct. 7, 2008

(65) Prior Publication Data

US 2010/0088201 A1 Apr. 8, 2010

(51) Int. Cl.
  *G06F 17/00* (2006.01)
  *G06G 7/00* (2006.01)
  *G06Q 10/00* (2012.01)
  *G06Q 30/00* (2012.01)

(52) U.S. Cl.
  USPC .......................... 705/400; 705/1.1; 705/7.35

(58) Field of Classification Search
  USPC .................. 705/1.1, 7.11–7.42, 400–412
  See application file for complete search history.

(56) References Cited

U.S. PATENT DOCUMENTS

| | | | |
|---|---|---|---|
| 5,204,699 A | 4/1993 | Birnbaum et al. | |
| 5,287,204 A | 2/1994 | Koizumi et al. | |
| 5,867,198 A | 2/1999 | Gwaltney et al. | |
| 6,064,838 A | 5/2000 | Maruta et al. | |
| 6,972,857 B2 * | 12/2005 | Mantell et al. | 358/1.14 |
| 2002/0136560 A1 | 9/2002 | Sadowara et al. | |
| 2003/0206307 A1 | 11/2003 | Handley et al. | |
| 2004/0012644 A1 | 1/2004 | Allen et al. | |
| 2005/0206982 A1 * | 9/2005 | Hattori | |
| 2005/0226503 A1 * | 10/2005 | Bailey et al. | 382/173 |
| 2008/0079967 A1 | 4/2008 | He | |
| 2009/0099980 A1 | 4/2009 | Ni et al. | |
| 2009/0195799 A1 | 8/2009 | Malik et al. | |
| 2009/0195800 A1 | 8/2009 | Malik et al. | |
| 2009/0195801 A1 | 8/2009 | Malik et al. | |
| 2010/0005038 A1 | 1/2010 | Nagarajan et al. | |
| 2010/0280929 A1 | 11/2010 | Coffey et al. | |

FOREIGN PATENT DOCUMENTS

EP 1413949 A1 4/2004

OTHER PUBLICATIONS

Ashlee Vance, New Inks Cut Costs of Office Color Printing, www.newyorktimes.com, May 6, 2009.
Xerox Corporation, Xerox ColorQube 9200 series Three Tiered Billing.
Rafael Diaz et al., Hybrid Color Plan White Paper Phaser 8860/8860MFP, Xerox Corporation, May 2008.
European Search and Examination Report issued in European Patent Application No. 09156779.2, mailed on Dec. 19, 2011.

* cited by examiner

*Primary Examiner* — George Chen
(74) *Attorney, Agent, or Firm* — Pillsbury Winthrop Shaw Pittman, LLP

(57) ABSTRACT

Disclosed herein is a method and system for determining a billing structure for outputting documents using an image processing apparatus. If image data of the document includes color pixels, a billing structure is determined based on an estimated total color pixel count. The color pixels of the image data are counted in a device independent space and the total color pixel count of the image data to be output in a device dependent space is estimated. Based on the estimation, a billing structure is chosen. Processing and determining a billing structure based on image data in the device independent space avoids charging a customer for color print job when only a small amount of color pixels are printed. It also encourages determining charges independently of the marking engine or output device.

17 Claims, 4 Drawing Sheets

SYSTEM AND METHOD FOR DETERMINING A BILLING STRUCTURE FOR DOCUMENTS BASED ON COLOR ESTIMATIONS IN AN IMAGE PATH

BACKGROUND

1. Field

The present disclosure is generally related to choosing a billing structure based on an amount of color in a document, and, in particular, to a system and method for determining a billing structure for outputting documents based on processing image data in device independent space.

2. Description of Related Art

Image data comprises a number of pixels having a number of components that contribute to defining the image, such as color and intensity. The image data generally includes various color or gray levels, which contribute to the intensity of each pixel in the image. Each pixel of the image is assigned a number representing the amount of light or gray level for that space at that particular spot; i.e., the shade of gray in the pixel. Binary image data has two possible values for each pixel, black (represented by the number "1") or white (represented by the number "0"). Images that have a large range of shades are referred to as grayscale images. For example, grayscale images have an 8-bit value (or higher) per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black, or composite black.

The pixels may also be defined in terms of device independent space (e.g., when inputting image data, such as standard RBG (sRGB) or CIE L*a*b) or a device dependent space (e.g., when outputting image data, such as RGB or CMYK). When outputting image data to an output device (e.g., copier, printer, or multi-function device (MFD)), a percentage scale may be used to identify how much ink is employed for a print job. Such information may typically be used for billing a customer for print jobs. For example, some methods employ a billing strategy based on an estimated amount of ink or toner consumption; others bill customers based on a print mode selection (e.g., draft, standard, color, enhanced, etc.) of the output device. In dynamic print-job environments, because printing documents using black ink or toner is less expensive than using colored ink or toner, billing is often based on the amount of color content contained in the job to be printed. In order to bill customers for color printing, color detection is an important feature required in image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. For example, a number of binary pixels associated with the CMYK color planes may be counted at the time of marking for output in the image path. Generally, however, with existing color detection and counting methods, a pixel will be labeled as color when the presence of any one of the C, M, and Y signals is detected. In solid ink and ink jet products, black pixels are typically rendered as composite black (using a CMYK plane or scale) in order to achieve a better output quality. When pixel counting is performed in the image path before marking, then, a page or document with composite black or grayscale image data will be classified as color. Such a classification may cause a higher color billing strategy or a higher billing tier to be selected, and therefore the customer may be billed for printing the document at a higher rate even if the document does not have a significant amount of color pixels. This is not generally acceptable from a customer point of view. Alternatively, fixing the price of print jobs irrespective of the content of the image is not acceptable from a supplier's point of view.

Accordingly, an improved system and method of estimating the amount of color content in a document and correctly billing customers is desirable.

BRIEF SUMMARY

One aspect of the disclosure provides a method for determining a billing structure for outputting documents having at least one page. The method is determined using an image processing apparatus having an image input terminal for inputting documents into image data and an image output terminal for outputting documents. The method includes: receiving image data of the document via the image input terminal. The image data includes a plurality of pixels. The method also includes processing the pixels of the image data into a device dependent space. The processing includes determining whether any color pixels are present in the received image data, and, in response to color pixels being present in the image data: examining the pixels of the image data to determine a pixel count of color pixels in a device independent space; estimating a total color pixel count of the image data to be output in the device dependent space using the determined pixel count; and determining a billing structure based on the estimated total color pixel count. The method also includes outputting the processed image data of the document in device dependent space using the image output terminal.

Another aspect of the disclosure provides a system for determining a billing structure for outputting documents comprising at least one page using an image processing apparatus. The image processing apparatus has an image input terminal for inputting documents and an image output terminal for outputting documents. The system includes: an image input terminal for inputting a document into image data including a plurality of pixels. The system also includes a plurality of processing elements for processing the pixels of the image data into a device dependent space and an output device for outputting a document. Each of the processing elements has an input and an output. Also, one of the processing elements is configured to determine an amount of color pixels present in the input image data, and, in response to color pixels being present in the image data: examine the pixels of the image data to determine a pixel count of color pixels in a device independent space; estimate a total color pixel count of the image data to be output in the device dependent space using the determined pixel count; and determine a billing structure based on the estimated total color pixel count.

Yet another aspect of the disclosure provides a computer readable medium having stored computer executable instructions, wherein the computer executable instructions, when executed by a computer, directs a computer to perform a method for determining a billing structure for outputting documents using an image processing apparatus. The method includes: receiving image data of the document. The image data has a plurality of pixels. The method also includes processing the pixels of the image data into a device dependent space. The processing includes determining whether any color pixels are present in the received image data, and, in response to color pixels being present in the image data: examining the pixels of the image data to determine a pixel count of color pixels in a device independent space; estimating a total color pixel count of the image data to be output in the device dependent space using the determined pixel count; and determining a billing structure based on the estimated total color pixel count. The method also includes outputting the processed image data of the document in device dependent space.

Other features and advantages of the present disclosure will become apparent from the following detailed description, the accompanying drawings, and the appended claims.

DETAILED DESCRIPTION

In order to increase the adoption of color usage in the marketplace, the following described system and methods provide better billing options for printing color pages. This disclosure proposes a method to solve the problem of appropriately charging customers for printing based on the color content in the page that is marked and output. For example, as noted above, in some instances, output devices such solid ink and/or ink jet devices or products may present problems such as charging customers for color printing when the page has little color content. This disclosure uses existing algorithms and processing elements (e.g., hardware) available in multifunction systems to determine a billing structure taking the above into consideration.

Generally, in known output systems (e.g., printers, copiers, MFDs), when a document is to be printed, it is input into a device and the image data is processed in an image path. Early in the image path when the image data is first processed, it is determined if the input image data comprises black and white (or gray) pixels of image data, i.e., no significant color image data in a color plane, or color pixels. Then, in these known systems, the image is determined to be a black and white or color image based on a pixel count determined during marking of the image data for output, and a billing strategy for outputting the document is employed.

However, when a document comprises a substantially larger amount of black and white content and a substantially smaller amount of color content, the chosen billing strategy may not be the most satisfactory or accurate. For example, when the number of pixels of image data are counted at a backend of the image path, such as by a back end image processing element or image output terminal (e.g., when marking a document for output), a document or page with composite black or gray image data may be classified as color. That is, after processing pixels of image data, composite black may be affected by its association with color content by being accidentally identified as a color pixel, or included in calculations for identifying color content of a page.

Figure 1:
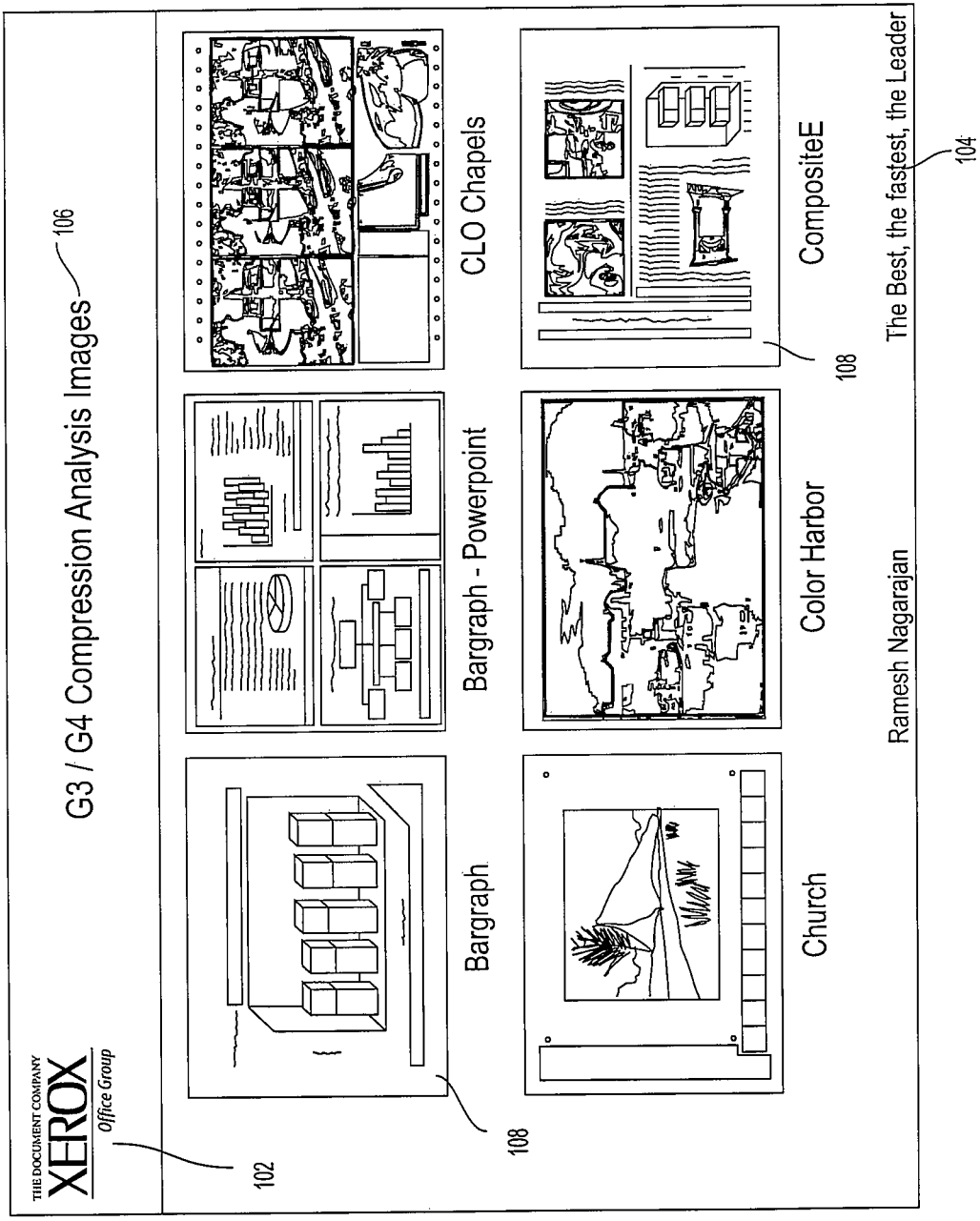
FIG. 1 illustrates a graphic representation of a page with text and objects therein in accordance with an embodiment of the present disclosure.

An example of such a document or page having a substantially smaller amount of color content may comprise, for example, a document having a colored logo, colored areas on company letterhead, and the like, such as shown in FIG. 1. FIG. 1 illustrates a graphic representation of a page or document 100 having a color text object 102 in a logo form on its top left and a color text object 104 on its bottom right. The remaining objects of the document 100 comprise monochrome text or line objects 106, and a plurality of monochrome graphic or monochrome halftone objects 108. For explanatory purposes only, objects 106 and 108 of FIG. 1 are considered to be of a black monochrome or grayscale composition (i.e., not comprising color pixels). Page 100 is an example of a page that may be input and output by an output device, such as an image processing apparatus. Generally, at least one page to be output is sent to an output device such as an MFD that includes at least the capability to print, copy, and/or scan documents. The types of objects to be output that are included in a document or page, of course, should not be limiting. For example, the page may include objects such as monochrome contone objects, monochrome text objects, monochrome line art, monochrome graphic objects, monochrome halftone objects, monochrome solid fill objects, color contone objects, color text objects, color line art objects, and/or color solid fill objects.

When a document such as page 100 is to be output for a print job, for example, it is desirous to bill a customer using a billing strategy for black and white pages, as, from a customer's point of view, the amount of color objects is limited and not substantial. From a supplier's point of view, fixing the price of a print job for document or page 100 irrespective of the content of the image data is also not acceptable. Using current page detection schemes that are available, page 100 may be considered a color page because of determining the bill after the processing and marking of the image data content in the device dependent color space and because of the additional color content 102, 104 on the top left and bottom right of the page 100. In particular, for solid ink products, color pixel counters at the backend of an image path of a device that count the number of binary color pixels to be printed would result in larger values because the number of composite black result in the need to be printed would be included in the counting of the number of color pixels to be printed. Thus, the page 100 would be incorrectly billed at a higher rate.

Figure 2:
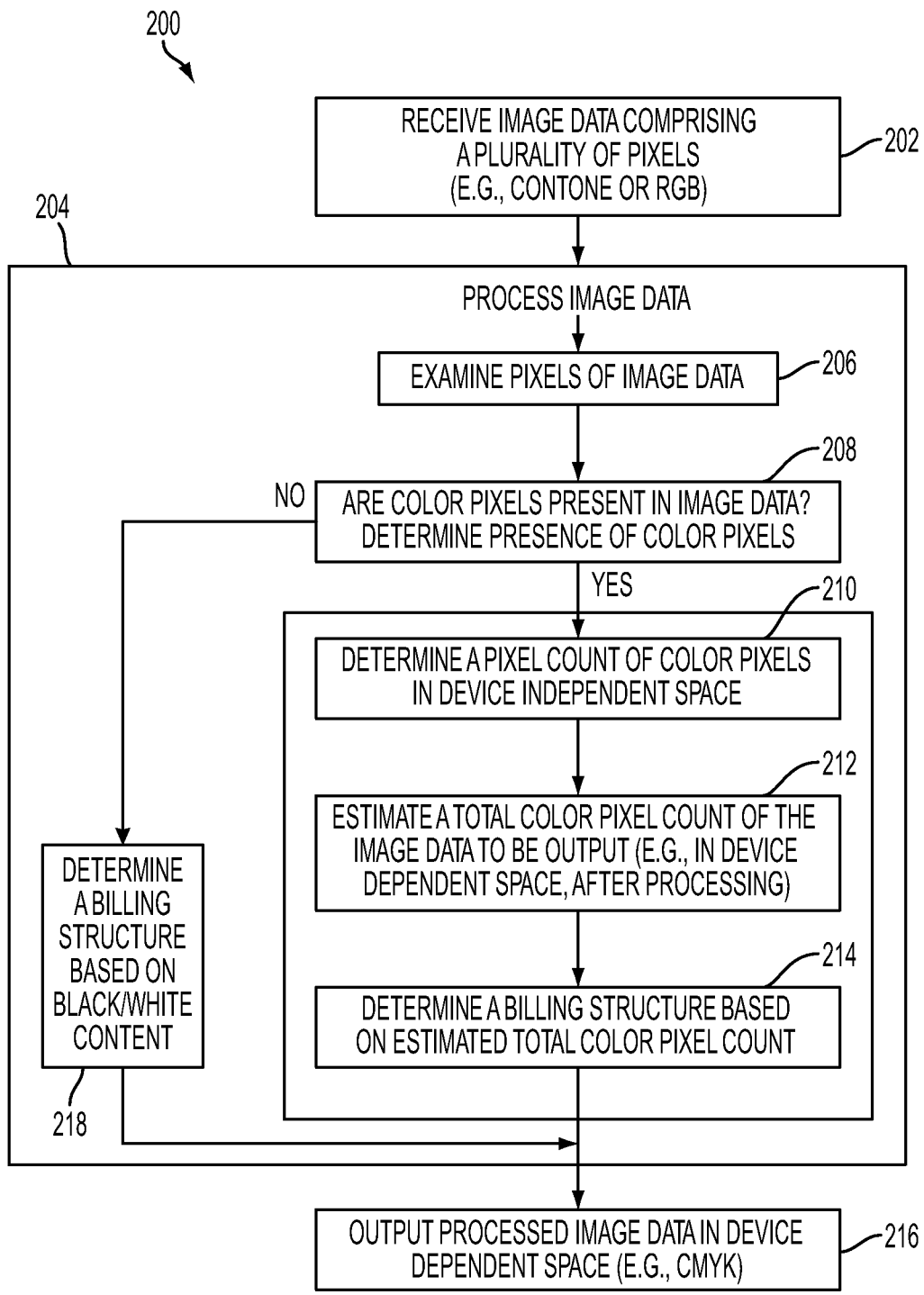
FIG. 2 illustrates a flow chart diagram illustrating a method for determining a billing structure for outputting documents in accordance with an embodiment of the present disclosure.

In order to prevent potential billing problems such as those noted above, the present disclosure provides a method 200 for determining a billing structure for outputting documents based on the image data in the document, as shown in FIG. 2. Generally, a billing structure is a method by which a charge to a user or customer for printing a document is calculated. A billing structure may be a calculation method associated with or correlated with tiers, thresholds, values, or algorithms, for example. Further details regarding billing structures are discussed below with reference to step 214.

The method 200 begins at step 202 by receiving a document comprising at least one page of image data. The image data comprises a plurality of pixels. In some embodiments, the image data is received or input in device independent space. Alternatively, the image data may be in device dependent space. For example, the image data may be received in contone or RGB color space, or alternatively, comprise black and white pixels. The page of image data in step 202 is representative of any type of page and may include a variety of objects to be detected and used by method 200; however method 200 may use a page that includes any combination of objects (including text). For example, the page may include objects such as monochrome color text object 102 and color text object 104 as provided on page 100 as shown in FIG. 1.

After receiving image data in step 202, the image data is processed at step 204. The processing of the image data at step 204 includes several steps for determining a billing structure for the page 100; however, they should not be limiting. The pixels of the image data are then examined at step 206. At step 208, a determination is made to determine the presence of color pixels in the document. If no color pixels or content are detected, then, at step 218, a billing structure is implemented based on no color content in the document having been detected (i.e., based on black/white content). The print/copy job would thus be billed at one rate. If color content is detected (e.g., detect at least one color object is present in the page) in the document, then, at step 210, a further examination of each pixel of image data is made to determine a color for that pixel. More specifically, a determination may be made to determine a pixel count of device independent image data for each category of color. The image data is examined in a device independent space before processing and/or marking so as to prevent errors in calculating the billing structure for the document or page, as will become further evident below.

An example of embodiments for determining a pixel being color may be found in U.S. application Ser. No. 12/025,972, filed Feb. 5, 2008 and U.S. Ser. No. 12/025,991, filed Feb. 5, 2008, each of which are hereby incorporated by reference in their entirety.

For example, in one embodiment, each pixel is counted as follows:

If $((C=O, M=O, Y=O)$ AND $(K=O))$ then the current pixel will be counted as a white pixel;

Else, if $((C=O, M=O, Y=O)$, AND $(K>O)$ AND $(K<=GRAY\_TH))$, where GRAY-TH is a threshold value for gray, then the current pixel will be counted as a gray pixel;

Else, if $((C=O, M=O, Y=O)$ AND $(K>GRAY\_TH))$ then the current pixel will be counted as a black pixel;

Else, if $((K==2^m-1)$ AND $(K+minCMY>=BLACK\_KMIN\_TH))$ where minCMY is a minimum value for color for the current pixel and where BLACK_KMIN_TH is a programmable minimum threshold value for black, then,
  if (K>=maxCMY−BLACK_KMAX_TH) where maxCMY is a maximum value for color for current pixel, and BLACK_KMAX_TH is a programmable maximum threshold value for black, then the current pixel will be counted as a black pixel;

Else, if $((maxCMY-minCMY>=2^m-1)$ and (K>=maxCMY−minCMYBLACK_KMIN_MAX_TH)), where BLACK_KMIN_MAXTH is a programmable offset value, then the current pixel will be counted as a black pixel. BLACK-MIN-MAX-TH is a programmable value which is generally an offset. It may even have a value of 0. An example of a typical value is 10.

Else, if ((C>=WHT_THR, M>=WHT_THR, or Y2>=WHT+THR) AND (maxCMY−minCMY>=RANGE_DIFF_COLOR)), where WHT_THR is a small threshold value for white, and where RANGE_DIFF_COLOR is a difference between two ranges and is greater than or equal to 2, then the current pixel will be counted as a color pixel;

Else, if (maxCMY−minCMY=0), then the current pixel will be counted as a could_be_gray pixel;

Else, if (maxCMY−minCMY=RANGE_DIFF_GRAY), where RANGE_DIFF_GRAY is a difference between two ranges and is less than 2, then the current pixel will be counted as a could_be_color pixel). The above three conditions may be changed, however, based on the way the ranges are set in color quantization, i.e. conversion from 8 bpp to 3 bpp (or 2 bpp).

As noted in these applications, several thresholds may be provided to determine if a pixel will be counted as a white, gray, or black pixel, or a true neutral, fuzzy neutral, fuzzy color, or true color pixel. However, the determination of the color for each pixel should not be limited to the above noted method. Any number of methods for determining a color of a selected pixel may be used and are within the scope of this disclosure.

After a pixel count for each category of color is determined, an estimated total color pixel count may be determined in step 212. More specifically, the total color pixel count of the image data to be marked and output in a device dependent space is estimated. For example, in an embodiment, an estimation may be made for the approximate total CMYK pixel count to be marked and output (i.e., after processing) using an output device. Such estimations may be based upon the determination of the pixel count for each category of color as provided in step 210, including an intensity (chroma intensity) of the color pixels, and additional algorithms. For example, when the image data is processed, algorithms may include developing and using a multidimensional look up table (LUT) which accepts image data values in device independent space (e.g., contone CIE L*a*b or sRGB) as input and has corresponding values in device dependent space (e.g., binary CMYK) as table entries. Additionally and/or alternatively, such algorithms used in the total color pixel count estimation may include a tone reproduction curve (TRC) used in generation of composite black pixels of the image data. Also, a correlation between actual pixel count and the color attributes of the pixels may be determined offline for the output device, and appropriate LUTs may be used for estimation.

Then, at step 214, a billing structure is determined based on the estimated total color pixel count. As noted above, the billing structure is a method by which a charge for printing a document is calculated. In some embodiments, the billing structure may include a plurality of factors. In some embodiments, a billing structure may include charging a customer for each page or sheet that is printed. In some embodiments, a billing structure may include a discount or reduction based on a volume of pages that are printed. In some embodiments, each method of each of the billing structures to be chosen may include an algorithm, formula, or other calculation(s) that are used to determine the charge for printing a page or document. Although other factors may be included, the billing structure is at least chosen based on the estimated total color pixel count of the document or page to be output. That is, the billing structure is chosen based on the estimations made analyzing device independent image data. Thus, the determination of the billing structure is independent of marking the image data using the output device.

The billing structures used with the image processing apparatus or output device should not be limiting. In an embodiment, it is envisioned that the billing structure(s) may be determined or based on a threshold value. For example, in an embodiment, the chosen or determined billing structure is based on the estimated total color pixel count of image data comprising an amount equal to or higher than a percentage threshold. In an embodiment, the percentage threshold may be based on a total window size required for the image data to be determined to have color pixels. The following is an example of determining such a billing structure:

Let color_th be the percentage threshold of the total window size required for a page to be determined to be a color page. Thus: color_th=(perct_th/100)*total window size.

If total_color_pixels is greater that or equal to color_th, where total_color_pixels=estimated color pixel count, then the billing is based on a color page;

else, if total_color_pixels is less than color_th, then the billing is based on a black and white or monochrome black page.

In another embodiment, the billing structure is based on a multi-tiered threshold value. The multi-tiered threshold value may be determined using accumulated total pixel counts for each color and a total color value. That is, for each category of color (e.g., true color, fuzzy color), black, white etc., the pixel count may be measured or weighed with reference to an estimated total color value. Based on such measurements or weights, the page or document may be billed by choosing a billing structure associated with a tier (e.g., Tier-1, Tier-2, Tier-3) based on the number of satisfied thresholds.

In some embodiments, an average value or medium value of an estimated total color pixel count or value may be used to determine a threshold for color billing. Generally, multi-tiered billing is known in the art. Various other multi-tiered billing strategies are also envisioned.

Using method 200, a billing cost for outputting the document is calculated based on the determined billing structure. For example, the method 200 may determine that a document such as page 100 is associated with a billing structure having a low color value or weight. Such a billing structure may be associated with a billing tier (such as Tier-1) which corresponds to calculating a billing cost for a customer based on black and white image data or content.

The herein described method of determining a billing structure is advantageous as it estimates the amount of color pixels to be printed before converting the image data from device independent space to device dependent color space, thereby preventing errors that may result from including composite black pixels as color pixels, which may be included in previous processes which depend upon counting color pixels at the time of marking or output. Thus, a more accurate billing structure may be chosen for pages which include a substantially smaller amount of color, such as illustrated by page 100.

Also, utilizing a billing structure such as illustrated by method 200 shown in FIG. 2 provides the capability to distinguish between multiple levels (or tiers) at which to bill a customer for outputting or printing pages. This is advantageous over known billing methods based on pure toner/ink consumption using the back end pixel counters or based on print mode selection, particularly in all types of marking and output devices. That is, the use of such color estimations of image data in the device independent space can be performed by all types of image processing apparatuses (xerographic, inkjet, solid ink), and thus provide standard pricing/billing points for customers irrespective of the underlying marking technology (i.e., independent of marking the image data). For example, a black page with a color logo at the bottom will be billed the same way in xerographic, solid ink or inkjet product since the estimation is done on the device independent image data (e.g., scanned in the contone domain). Thus, even though composite black may be used by the output device to produce a greater image quality, customers would still be billed for a page comprising black and white content.

This approach is also independent of the rendering strategy used. For example, when rendering a plurality of types of categories of color such as CMYK, generally some type of under color removal (UCR) and/or gray component replacement (GCR) strategy is employed to establish the relative proportions of CMY and K to produce an output color. Such strategies such as UCR/GCR or TRC correction, for example, may be applied to the image data without altering the billing structure.

Additionally, this method decreases the amount of knowledge required by both customers and sales teams regarding the processing of image data and interaction of color tables and rendering algorithms for each of the provided billing strategies. Furthermore, the disclosed method and system allows for new and additional cost options to be developed and tailored to customers.

The billing structure selection process as described also allows users or customers to use existing algorithms and hardware present in output devices or products such as MFDs rather than have the need to add additional hardware and/or image data processes. For example, algorithms for manipulating data (e.g., scanline buffers for edges of image data) do not necessarily need to be implemented. Additional advantages of the disclosed method are described with regard to FIG. 4 below.

Figure 3:
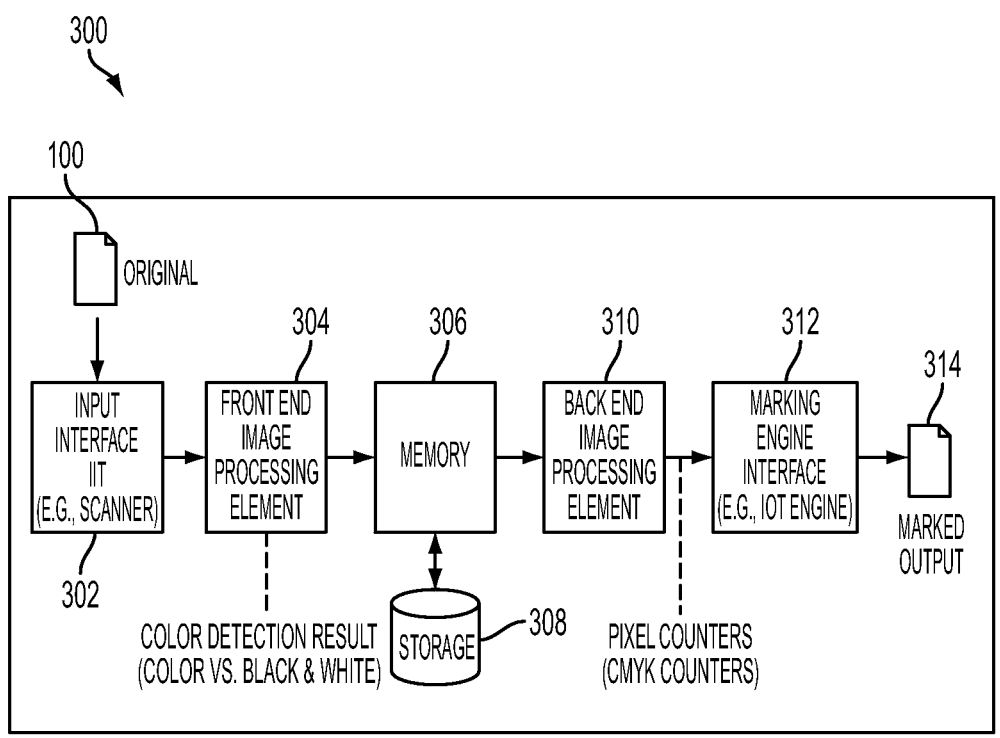
FIG. 3 illustrates a block diagram of an example of an image path for processing image data in accordance with an embodiment of the present disclosure.

FIG. 3 illustrates a block diagram of an example of an image path 300 for processing image data of an output device or apparatus such as an MFD. The device comprises, among other devices, an image input terminal (IIT) 302, a processor or processing elements 304 and 310, a memory 306 and/or a storage device 308, and an image output terminal (IOT) 312 and/or marking engine interface. Generally, the above elements (as will be described) of the device are provided to perform functions that assist in receiving image data such as a scanned document, configuring the image path of the processing elements 304 and 310 to process the image data, and outputting the image data such as printing a document according to an output mode that may be selected. However, it should be noted that the apparatus or device may comprise additional elements not described herein or alternative elements for performing similar functions, and should not be limited to those elements as illustrated in FIG. 3. Generally, the image path shown in FIG. 3 corresponds to any number of output modes that may be selected for an image processing apparatus.

The IIT (herein referred to as a scanner but not limited thereto) 302 is used to scan or acquire an input document or page into image data. The scanner 302 may be a digital scanner, for example. Generally, however, any device used to scan or capture the image data of a document for an image processing apparatus is regarded and will be referred to as a scanner. For example, the image data may be captured by a scanner in a copier, a facsimile machine, a multi-function device, a camera, a video camera, or any other known or later device that is capable of scanning a document and capturing electronic image data. In some embodiments, IIT or scanner 302 may be connected to a network or telephone system, for example, to receive as input image data such as via a facsimile (fax) machine or computer (CPU). Input documents and/or image data may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), Voice Over IP, WiFi network, or other networks or systems, or a combination of networks and/or systems, for example, and should not be limited to those mentioned above.

In any case, image data, such as image data for an original document 100, may be received or input in either device dependent or device independent space from the scanner 302, depending on the capability of the scanner (IIT) or the architecture of the system. The scanner 302 may capture image data as binary or contone image data, for example. Generally, when the input image data from the IIT is in device dependent space, the image path 300 will typically convert such image data to some device independent space for further processing before converting the image data it to (output) device dependent space. The input and output devices deal with different device dependent color spaces, and most of the image processing in the image path 300 is performed in a device independent space to produce output images of the highest possible quality.

FIG. 3 also shows a processor or processing elements for processing and/or manipulating image data using a plurality of operations and/or processes. The description of the processing elements below is an example of devices capable of implementing processes to be performed and should not be limiting. For example, additional processing elements may be provided along the image path 300. Alternatively, additional operations may be performed on the image data other than or in addition to those described with reference to FIG. 3.

The image path 300 may comprise a plurality of image processing elements (or processor) and for manipulating image data received from the scanner 302 using a plurality of operations and/or processes. The processing elements and may be a combination of image processing elements which comprise software and hardware elements that perform a number of operations on the image data received from the scanner 302 (or other source) using a set of parameters. The parameters are used to convert the images to the format desired as output (e.g., high quality) along the image path. The processing elements may be a part of a computer system or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path comprises a front end processing element 304, a memory 306, storage 308, and a back end processing element 310. The front end processing element 304 is an image processing element that first receives image data in an image path and is used to process the image data according to user preferences such that it may be stored and later retrieved for output. The back end processing element 310 is generally used at the end of an image path to retrieve stored image data and to process the image data such that the image data may be output to a printing device as an accurate recreation of the original input or scanned image. Of course, processing elements may also be used for compression and/or decompression of image data.

Each of the image processing elements comprises an input and an output. Additionally, the system or apparatus may also include one or more controllers or routers (not shown) to select and route the image data between the processing elements 304 and 310 and memory 306 and/or storage 308, for example.

Front end processing element 304 receives as input the image data from the scanner 302 via a scanning engine interface, for example, and processes the image data. Front end processing element 304 may be used to process the scanned image data as well as determine user-defined operations generally known in the art. For example, the front end processing element 304 may be used for color space conversion, reduction or enlargement, document registration, and/or performing other operations or processes on the image data, for example. In some embodiments, the front end processing element 304 convert the image data (e.g., from device dependent to device independent image data) for processing. In the herein disclosed method, front end processing element 304 is used to determine a billing structure, such as noted in step 214 of the method 200 in FIG. 2, and further described below with regard to FIG. 4.

Memory 306 and/or storage 308 may be used to store image data. For example, memory 306 and/or storage 308 may be used to temporarily store the original image data of document input via IIT 302. Converted (e.g., binary to contone image data) or compressed image data may also be stored in the memory 306 and/or storage 308. Memory 306 and/or storage 308 may be used to store machine readable instructions to be executed by the processor/processing elements. The memory 306 and/or storage 308 may be implemented using static or dynamic RAM (random access memory), a floppy disk and disk drive, a writable optical disk and disk drive, a hard disk and disk drive, flash memory, or the like, and may be distributed among separate memory components. The memory 306 and/or storage 308 can also include read only memory, or other removable storage drive(s) or memory devices.

The front end processing element 304 may communicate with memory 306 and/or storage 308 of apparatus 300 to store processed and/or compressed image data, for example. Compressed image data may be stored in memory 306 and/or storage 308 temporarily or for a later time when needed. When the image data is needed or it is time for marking (e.g., using the marking engine interface/IOT 312 or printing device), the image data may be retrieved from memory 306 and/or storage 308 via the back end processing element 310 to export the image data that has been scanned, for example.

Back end processing element 310 receives processed image data from the memory 306 or storage 308. Back end processing element 310 may be used to further render the image data for output. For example, back end processing element 310 may be used to convert the color space of the processed image data (e.g., convert from device independent CIE L*a*b color space to device dependent CMYK color space), provide color balance, further rendering, filtering, and/or other operations or processes. Subsequently, the back end processing element 310 may be used to decompress the image data and output the image data to the IOT 312. The output of processed image data from the back end processing element 310 depends on the image path (or output mode). Also, back end processing element 310 may be used to determine the toner/ink consumption of the output device.

In an embodiment, the processed image data may be directly output to the marking engine interface or IOT 312 for printing using a printer/MFD. The IOT 312 or marking engine interface may be associated with a printer or MFD which is used for printing documents. The IOT or marking engine interface is used to output the processing image data to the printer. Specifically, the image output terminal IOT 312 or marking engine interface is designed to receive the reconstructed and processed image data in device independent space in order to send or output the image data to the printer for a copy or print job. The IOT 312 or marking engine interface may further perform image processing on the image data to make corrections or compensate for deviation in the printing process. Alternatively, the back end processing element 310 may be used to perform further image processing on the image data.

The IOT 312 outputs processed image data to the printer to complete the image path, for example. Of course, the algorithms and processes used by the elements in the image path shown in FIG. 3 should not be limiting. Any number of data compression algorithms (e.g., lossless, lossy), decompression algorithms, color conversion algorithms (e.g., contone to binary, or binary to grayscale) and the like may be performed to provide a high quality output document 314.

Figure 4:
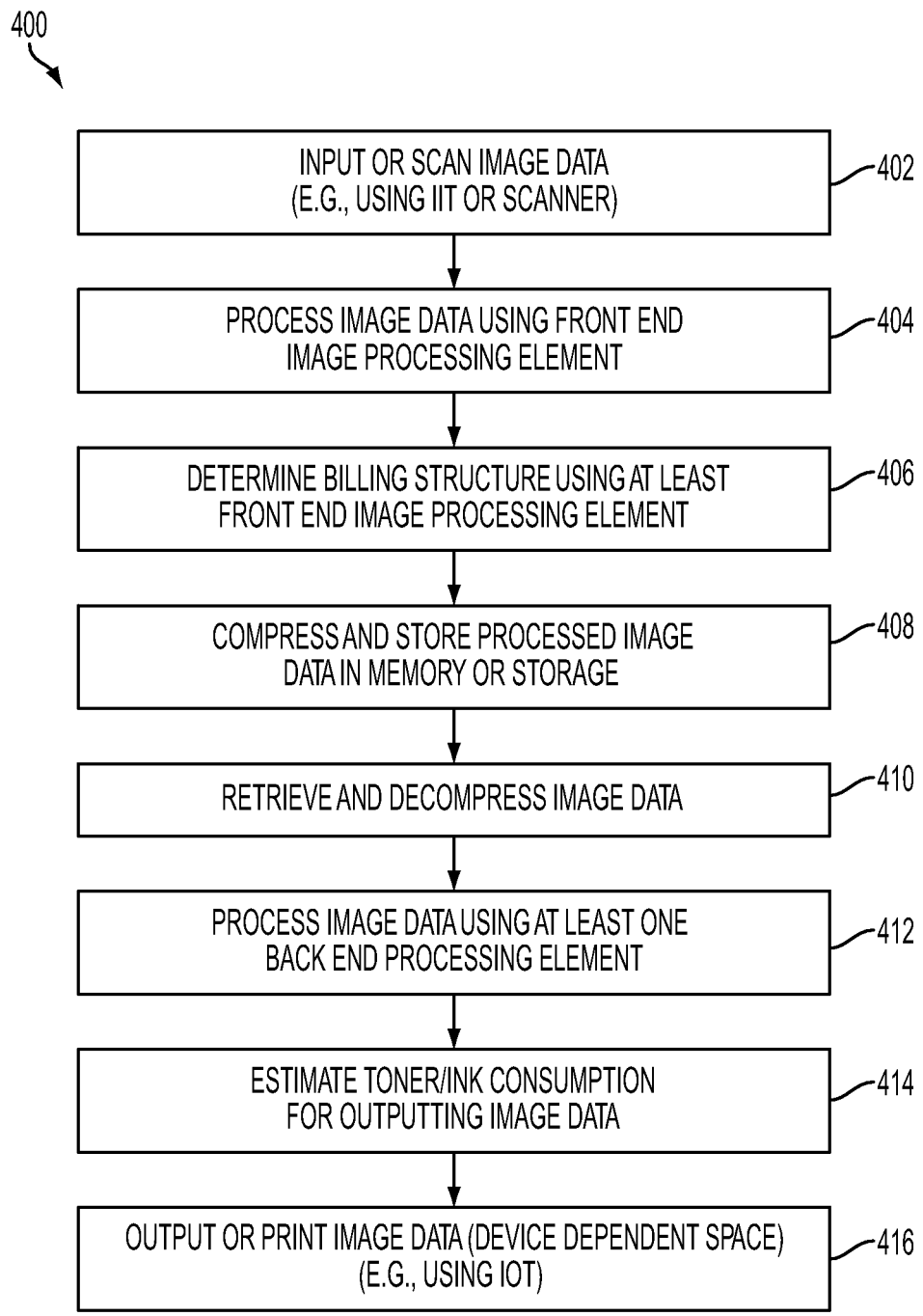
FIG. 4 illustrates a flow chart diagram illustrating a method of processing image data along the image path of FIG. 3.

FIG. 4 illustrates a flow chart diagram illustrating method 400 of processing image data using the devices and elements along the image path 300 of FIG. 3. The method 400 comprises inputting or scanning image data at step 402 using IIT or scanner 302 of an image processing apparatus as shown FIG. 3, for example. At step 404, the image data is processed using the front end image processing element 304. In particular, the front end image element 304 estimates the amount of color pixels to be printed based on the color pixel counts of the image data. The pixels are first examined in a device independent space and then a total color pixel count may be estimated for the image data to be output in a device dependent space. A billing structure is then determined, using the front end image processing element, at step 406 (e.g., based on the estimated total color pixel count). The image data may then be further processed, compressed, and stored in memory 306 or storage 308 at step 408. When it is time to mark or output the image data, the image data is retrieved and decompressed at step 410. The image data is then processed using at least one back end processing element at step 412. For example, the image data may be converted from device independent space to device dependent space (e.g., contone CIE L*a*b to binary CMYK). The image data is output (e.g., printed or copied) in device dependent space using the IOT 312 at step 416.

Also, in some embodiments, at step 414 in method 400, toner or ink consumption for outputting the marked image data may be estimated. The amount of toner/ink consumption may be estimated by determining an actual pixel count (for each category of pixels), for example. The actual pixel count, however, would only be used for predicting the toner/ink consumption. In some embodiments, an amount of toner/ink consumption for outputting the image data of the document may be based on the estimated total color pixel count. Therefore, the estimation of toner/ink consumption as provided in step 414 may occur at any time in the process, such as by front end image processing element. In some embodiments, the estimated amount of toner/ink consumption is determined using a Look Up Table (LUT). The LUT may be based on a selected output quality mode (Photo, text, mixed, etc.) and/or a marking resolution of the image processing apparatus or output device. Of course, the counting and/or estimating provided by step 414 need not be included in the method 400.

Other embodiments include incorporating the above steps into a set of computer executable instructions readable by a computer and stored on a data carrier or otherwise a computer readable medium, such that the method 200 is automated. FIG. 2 shows a flow chart of such computer readable instructions. For example, in some embodiments, memory or storage of an output device carrying computer readable instructions is configured such that when the computer readable instructions are executed by a computer, they cause a computer to automatically perform a method for determining a billing structure for outputting documents.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that this disclosure has been fully and effectively accomplished. It will be realized, however, that the foregoing embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A processor-implemented method for determining a billing structure for outputting documents comprising at least one page using an image processing apparatus, the image processing apparatus comprising an image input terminal for inputting documents into image data, at least one processor, and an image output terminal for outputting documents, the method being implemented by the at least one processor, the method comprising:
receiving image data of a document via the image input terminal, the image data comprising a plurality of pixels;
processing the pixels of the image data into a device dependent space using the at least one processor, the processing including determining whether any color pixels are present in the received image data, and, in response to color pixels being present in the image data:
examining the pixels of the image data to determine a pixel count of color pixels in a device independent space;
estimating a total color pixel count of the image data to be output in the device dependent space using the determined pixel count;
determining a billing structure based on the estimated total color pixel count, and
outputting the processed image data of the document in device dependent space using the image output terminal.

2. A method according to claim 1, further comprising estimating an amount of toner/ink consumption for outputting the image data of the document based on the estimated total color pixel count.

3. A method according to claim 2, wherein the estimated amount of toner/ink consumption is determined using a Look Up Table.

4. A method according to claim 3, wherein the Look Up Table is based on an output quality mode selected and a marking resolution for the image processing apparatus.

5. A method according to claim 1, wherein the image processing apparatus further comprises a front end processor, and wherein the examination and estimation of the image data in the device independent space is performed using the front end processor of the image processing apparatus.

6. A method according to claim 1, further comprising, in response to color pixels not being present in the received image data, determining a billing structure based on black and white pixels of the image data.

7. A method according to claim 1, wherein the determined billing structure is based on the estimated total color pixel count comprising an amount equal to or higher than a percentage threshold, the percentage threshold based on a total window size required for the image data to be determined to have color pixels.

8. A method according to claim 1, wherein the determined, billing structure is based on a multi-tiered threshold value, the multi-tiered threshold value being determined using accumulated total pixel counts for each color and a total color value.

9. A method according to claim 1, wherein a billing cost for outputting the document is calculated based on the determined billing structure.

10. A method according to claim 1, further comprising:
   determining an output pixel count of color pixels in the device dependent space, and
   determining toner consumption based on the determined output pixel count.

11. A computer system for determining a billing structure for outputting documents comprising at least one page using an image processing apparatus, the image processing apparatus comprising an image input terminal for inputting documents and at least one processor for executing stored machine readable instructions, the system comprising:
   the image input terminal for inputting a document into image data, the image data comprising a plurality of pixels; and
   the at least one processor for processing the pixels of the image data into a device dependent space, each processor comprising an input and an output,
   wherein the at least one processor is configured to execute stored machine readable instructions to determine an amount of color pixels present in the input image data, and, in response to color pixels being present in the image data:
      examine the pixels of the image data to determine a pixel count of color pixels in a device independent space;
      estimate a total color pixel count of the image data to be output in the device dependent space using the determined pixel count; and
      determine a billing structure based on the estimated total color pixel count.

12. A system according to claim 11, further comprising a front end processor, and wherein the examination and the estimation of the image data in the device independent space is performed using the front end processor.

13. A system according to claim 11, the system further comprising an image output terminal for marking image data of the document, and wherein the determination of the billing structure is independent of marking the image data using the image output terminal.

14. A non-transitory computer readable storage medium having stored computer executable instructions, wherein the computer executable instructions, when executed by a computer, directs a computer to perform a method for determining a billing structure for outputting documents using an image processing apparatus, the method comprising:
   receiving image data of the document, the image data comprising a plurality of pixels;
   processing the pixels of the image data into a device dependent space, the processing including determining whether any color pixels are present in the received image data, and, in response to color pixels being present in the image data:
      examining the pixels of the image data to determine a pixel count of color pixels in a device independent space;
      estimating a total color pixel count of the image data to be output in the device dependent space using the determined pixel count;
      determining a billing structure based on the estimated total color pixel count, and outputting the processed image data of the document in device dependent space.

15. A medium according to claim 14, further comprising, in response to color pixels not being present in the received image data, determining a billing structure based on black and white pixels of the image data.

16. A medium according to claim 14, wherein the determined color billing structure is based on the estimated total color pixel count comprising an amount equal to or higher than a percentage threshold, the percentage threshold based on a total window size required for the image data to be determined to have color pixels.

17. A medium according to claim 14, wherein the determined color billing structure is based on a multi-tiered threshold value, the multi-tiered threshold value being determined using accumulated total pixel counts for each color and a total color value.

* * * * *